US008103642B2

(12) United States Patent
Ho et al.

(10) Patent No.: US 8,103,642 B2
(45) Date of Patent: Jan. 24, 2012

(54) ADAPTIVE REGION LOCKING

(75) Inventors: Eugene Ho, San Ramon, CA (US); Wilson Wai Shun Chan, San Mateo, CA (US); Tak Fung Wang, Redwood City, CA (US); Angelo Pruscino, Los Altos, CA (US); Tolga Yurek, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 739 days.

(21) Appl. No.: 11/346,822

(22) Filed: Feb. 3, 2006

(65) Prior Publication Data

US 2007/0185872 A1 Aug. 9, 2007

(51) Int. Cl.
*G06F 7/00* (2006.01)
*G06F 17/00* (2006.01)
*G06F 15/173* (2006.01)

(52) U.S. Cl. ......... 707/704; 707/650; 707/653; 709/225
(58) Field of Classification Search .................. 709/229, 709/104, 225; 707/8, 100, 999.008, 704, 707/650, 653; 715/229; 710/200; 712/30; 711/137, 151

See application file for complete search history.

(56) References Cited

U.S. PATENT DOCUMENTS

| 5,414,839 | A | | 5/1995 | Joshi | |
|---|---|---|---|---|---|
| 6,144,983 | A | * | 11/2000 | Klots et al. | 718/104 |
| 6,385,613 | B1 | * | 5/2002 | Grewell et al. | 707/8 |
| 6,473,849 | B1 | * | 10/2002 | Keller et al. | 712/30 |
| 6,748,470 | B2 | * | 6/2004 | Goldick | 710/200 |
| 6,751,616 | B1 | * | 6/2004 | Chan | 707/8 |
| 6,751,617 | B1 | * | 6/2004 | Anfindsen | 1/1 |
| 7,080,075 | B1 | * | 7/2006 | Chan et al. | 1/1 |
| 7,962,453 | B2 | * | 6/2011 | Chandrasekaran | 707/650 |
| 2004/0117345 | A1 | * | 6/2004 | Bamford et al. | 707/1 |
| 2004/0225742 | A1 | * | 11/2004 | Loaiza et al. | 709/229 |

(Continued)

FOREIGN PATENT DOCUMENTS

WO WO2004/031954 A2 4/2004

OTHER PUBLICATIONS

"Cache Fusion and the Global Cache Service" *Oracle 9i Real Application Clusters Concepts Release* 2(9.2) Part No. A96597-01 (1998) pp. 1-6.

(Continued)

*Primary Examiner* — Mohammad Ali
*Assistant Examiner* — Bao Tran
(74) *Attorney, Agent, or Firm* — Hickman Palermo Truong & Becker LLP; Daniel D. Ledesma

(57) ABSTRACT

A method and apparatus for managing locks in a database system is provided. A master node grants a lock on a first resource and a group of resources that includes the first resource to a first requester node. The requester node receives a mapping corresponding to the group of resources that may indicate that a lock already exists for a second resource in the group. If the requester node desires a lock on a resource located in the group, the requester node grants itself the lock without notifying the master node. A second requester node requests a lock for a particular resource in the group of resources. The first requester node grants the lock on the particular resource and updates the mapping to indicate that a different node holds a lock for the particular resource.

36 Claims, 6 Drawing Sheets

U.S. PATENT DOCUMENTS

2005/0044092 A1* 2/2005 Adya et al. .................. 707/100
2006/0143178 A1* 6/2006 Chan et al. ..................... 707/9
2006/0212573 A1* 9/2006 Loaiza et al. ................ 709/225
2006/0248127 A1* 11/2006 Whitehouse ................ 707/203

OTHER PUBLICATIONS

Claims, International application No. PCT/US2007/002020, 3 pages.
International Searching Authority, "Notification of Transmittal of The International Search Report and The Written Opinion of The International Searching Authority, or The Declaration", International application No. PCT/US2007/002020, dated Aug. 7, 2007, 14 pages.
Schobel-Turner, Thomas, "Generalized Optional Locking in Distributed Systems", XP-002443401, Operating Systems Research Day 2004, dated Dec. 16, 2004, 10 pages.
Kohler, Walter H., "A Survey of Techniques for Synchronization and Recovery in Decentralized Computer Systems", XP-002443402, Computing Surveys USA, vol. 13, No. 2, dated Jun. 1981, pp. 149-183.

* cited by examiner

Mapping 300

| 0 | 1 | 2 S-local | 3 Lock mode = S |
|---|---|---|---|
| 4 | 5 | 6 | 7 X |
| 8 | 9 | 10 | 11 |
| 12 | 13 | 14 | 15 |

306 → S-local
302 → Lock mode = S
304 → X

FIG. 3

ADAPTIVE REGION LOCKING

FIELD OF THE INVENTION

The present invention relates to locking resources, and more particularly to aggregate locking.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Multiple processes running on multi-processing systems may access shared resources, such as disk blocks. Some of these shared resources may be accessed by only one process at a time, while others may be accessed concurrently by multiple processes. Consequently, "synchronization mechanisms" have been developed to control access by multiple processes to shared resources. The synchronization mechanism grants locks to processes. Locks grant to holders of the locks the right to access a particular resource in a particular way. Once a lock is granted to a process, the process holds or owns the lock until the lock is relinquished, revoked, or otherwise terminated. Locks are represented by data structures such as semaphores, read/write latches, and condition variables. There are many types of locks. Some types of locks allow shared resources to be shared by many processes concurrently (e.g. shared read lock), while other types of locks prevent any type of lock from being granted on the same resource (exclusive write lock).

The entity responsible for granting locks is referred to herein as a lock manager. In a single node multi-processing system, a lock manager is typically a software component executed and invoked by processes on the node accessing a shared resource.

In contrast to a single node system, a multi-node system consists of network of computing devices or "nodes, each of which may be a multi-processing system. Each of the nodes can access a set of shared resources. Multi-node systems use synchronization mechanisms, referred to as global synchronization mechanisms, to control access to the set of shared resources by nodes in the multi-node system.

A global lock mechanism includes a global-lock manager that is responsible for issuing locks to processes on the multi-node system. In order for a node to access a shared resource, it is granted a "global lock" by a global lock manager. A global lock is a lock that can be granted by a global lock manager on a node in a multi-node system to one or more processes on another node to coordinate access to the shared resources among the processes executing on any node in a multi-node system.

A type of global lock manager is a distributed lock manager, which is comprised of local lock managers that are distributed on the nodes of a multi-node system, with one or more of the local lock managers running on each node in a multi-node system. Each lock manager is responsible for coordinating the global locks for processes on the local lock manager's node. A local lock manager is referred to as the local lock manager with respect to the node on which it resides; the node and a process running on the node are referred to as a local node and local process with respect to the local lock manager and the node.

A local lock manager residing on a node issues global locks to lock managers on the other nodes and to processes running on the same node as the local lock manager. A process needing a global lock on a resource managed by a non-local lock manager requests the global lock from its local lock manager. If a local lock manager already holds a compatible global lock, the local lock manager issues a global lock to the local process. If the local lock manager does not hold a compatible global lock, the local lock manager first obtains one from the non-local lock manager. Once obtained, the local lock manager issues the global lock to the local process.

For convenience of expression, the global locks issued by local lock managers to local processes are referred to herein as local locks. Thus, a local lock manager obtains a global lock from another lock manager and issues compatible local locks to local processes.

Also, for convenience of expression, nodes are described herein as performing actions and as being the object of actions. However, this is just a convenient way of expressing that one or more processes on a node are performing an action or is the object of an action. For example, a lock manager requesting, obtaining, and issuing a global lock or local lock may be described as a node requesting, obtaining, and issuing a global lock or local lock.

Acquiring global locks can be more expensive to acquire than acquiring only local locks. This is because a global lock may entail inter-node communication and interaction between a local lock and a local lock manager on another node.

Such interaction can entail a particularly expensive form of an operation referred to as a ping. A ping occurs when the version of a resource that resides in the cache of one server must be supplied to the cache of a different server. Thus, a ping occurs when, after a node A modifies resource x in its cache, another node B requires resource x.

Cache Fusion

One way of performing a ping is referred as cache fusion. Transferring cache copies of a resource between nodes is performed to speed up locking mechanisms. FIG. 1 is a block diagram that illustrates a multi-node system 101 and a cache fusion protocol for requesting and transferring cached resources, according to an embodiment of the invention. Nodes in system 101 may communicate directly with each other or via a network, such as a LAN, or the Internet. In order to acquire a global lock on a shared resource, the cache fusion protocol begins when a requesting node 104 requests a lock on a particular shared resource (step 112) from a master node 102 where the lock manager for the particular shared resource resides.

Master node 102 receives the request and determines whether any other node holds an incompatible lock on the shared resource. In the simple case where no node holds an incompatible lock on the shared resource, the master node grants the lock directly to the requesting node. If the master node itself holds an incompatible lock on the shared resource, then the master node will eventually grant a lock on the shared resource directly to the requesting node. Otherwise, another node (i.e., a holding node 106) holds an incompatible lock on the shared resource.

The master node sends a message to holding node 106 (step 114) indicating that requesting node 104 requests a lock on the particular shared resource for which holding node 106 holds the lock. Holding node 106 grants the lock and may send a copy of the shared resource directly to requesting node 104 (step 116). In some cases, even a compatible lock held by holding node 106 on the shared resource (e.g., requesting node 104 requesting a shared lock on the resource and holding node 106 holds a shared lock on the resource) will trigger an interconnect message from holding node 106 to requesting node 104 because holding node 106 may hold a dirty, or modified, version of the shared resource.

Lastly, once requesting node 104 receives the shared resource and the lock, requesting node 104 notifies master node 102 (step 118) that requesting node 104 has the lock on the shared resource. Therefore, each request for a lock on a shared resource may cause four inter-node messages to be generated. Techniques are thus needed to reduce the cost of acquiring global locks.

One technique to reduce the cost of acquiring global locks is to use a "mastering technique" that assigns a master node to a subset of shared resources based on patterns of access to shared resources. (A master node for a shared resource governs access by other nodes to the shared resource.) For example, if most of the accesses to a portion of shared data are performed by a particular node, that node is assigned as the master node for that portion of the shared data. This reduces the messaging overhead between nodes because less global locks will have to be acquired since the particular node demanded most of the accesses to the portion of shared data. Future accesses to the portion of shared data will only require the granting of local locks with respect to the particular node. However, mastering does not eliminate the cost of executing more instructions to acquire a global lock.

Another technique to reduce the cost of acquiring global locks is to use coarse-grain locking. In this scheme, locks are acquired at a higher level of granularity, such as a table or file, instead of a finer level of granularity, such as a row or a disk block. When a lock is acquired at the higher level of granularity, it is implicitly granted for levels of shared data at a finer level of granularity. For example, if a global lock is acquired for an entire table, individual global locks for the rows or blocks for the table are implied and do not have to be acquired, avoiding the cost of obtaining a global lock for each row and block.

The advantage of this technique is that it does not depend on the assignment of a master node. A significant disadvantage, however, is that this technique can lead to false contention. Specifically, if a node needs to modify a row in a table that has been locked by another node in a conflicting mode, that node must relinquish the lock on the table although the two nodes may be accessing different rows or even different blocks.

Another technique to reduce the cost of acquiring global locks is to use hierarchical locking. In this scheme, locks are first acquired at a higher level in the hierarchy, such as a table. If a global lock is acquired at a higher level in the hierarchy, global locks are implicitly granted at the lower level of the hierarchy. When another node subsequently needs to access data in the lower level of the hierarchy, such as a row or a block, in a conflicting mode, the first node de-escalates its lock and acquires locks at the lower level in the hierarchy.

The disadvantage of this technique is that the cost of obtaining a global lock is inflated and shifted to the requesting node whose lock request triggers the de-escalation. To honor the request, work is performed to acquire global locks for all the shared data at the lower level of the hierarchy. This work is performed despite the requesting node having requested a lock on only a small portion of the shared data.

As clearly shown, techniques are needed to reduce the cost of acquiring global locks that avoid the pitfalls attendant to techniques described above for reducing the cost of global locks.

DESCRIPTION OF THE DRAWINGS

The present invention is illustrated by way of example, and not by way of limitation, in the figures of the accompanying drawings and in which like reference numerals refer to similar elements and in which:

FIG. 3 is a diagram illustrating a mapping, on a particular node, for a group of shared resources, according to an embodiment of the present invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A method and apparatus for managing locks in a database system is provided. A first requester node requests a global lock on a first resource and a master node grants the lock on the first resource as well as a group of resources that includes the first resource. Granting a global lock on the group of resources is performed based on the assumption that the first requester will tend to access other resources in the group. The requester node receives a mapping corresponding to the group of resources that may indicate that a global lock held by another node already exists for a second resource in the group. The requester may grant itself a local lock compatible with the lock on the group of resources without notifying the master node.

A second requester node may request a global lock for a particular resource in the group of resources. The first requester node may then relinquish or down convert the lock on the particular resource and grant the lock on the particular resource to the second requester. The first requester may update the first requester node's mapping to indicate that a different node (i.e., the second requester node) holds the lock on the particular resource. If the first requester node has been modified, or dirtied, the particular resource, the first requester node will also send data corresponding to the modification.

Requesting a Lock on a Resource

Figure 2:
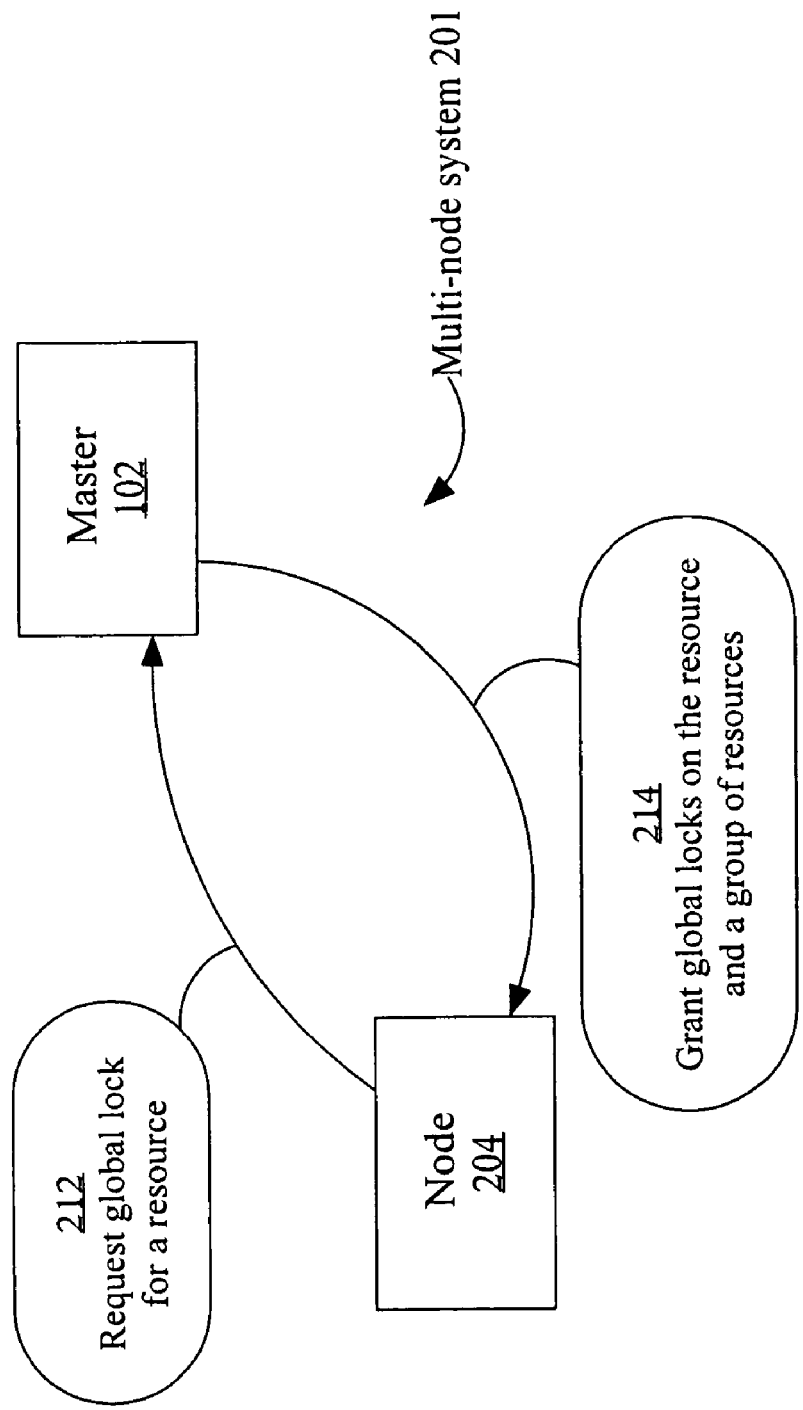
FIG. 2 is a block diagram that illustrates a multi-node system and a method for obtaining a lock on a group of shared resources, according to an embodiment of the invention.

FIG. 2 is a block diagram that illustrates multi-node system 101 and a method for obtaining a lock on a group of shared resources, according to an embodiment of the invention. A resource is, generally, any item that can be shared by nodes in the multi-node system. A common example of a resource is a database data block. Thus, a group of resources may correspond to a set of two or more contiguous data blocks stored in persistent storage.

A master 102 node is responsible for granting global locks to other nodes for shared resources in a database system. Initially, a node 204 requests a global lock of a particular type for a resource or a group of resources (step 212). The request may include a request for both a global lock on a particular resource and a global lock on a particular group of resources that includes the resource. The request from node 204 may also be a request for a global lock only on either the particular resource or the particular group of resources.

Master 102 sends node 204 a message granting the request for the global lock, such as a shared lock, on at least a group of resources (step 214). If the request from node 204 is for a particular resource, then master 102 determines dynamically (or may have determined statically) that the particular resource is within a particular group of resources (e.g., set of consecutive data blocks). Master 102 sends a mapping corresponding to the group of resources that indicates a lock and lock type for all the resources in the group. If a local process on node 204 requests a global lock on any resource in the group of resources identified in the mapping, wherein the requested global lock is compatible with the global lock on the group of resources, the local lock manager of node 204 simply grants the local process the lock and updates the mapping without having to request master 102 for the lock.

For example, if the global lock for the group of resources is a shared lock, then node 204 will not have to request a shared lock from master 102 for any resources in the group to grant a local shared lock to a local process. In essence, node 204 receives a lock for a plurality of resources in only one message.

The global lock granted for the group of resources may be the same as or different from the global lock for the particular resource. For instance, if node 204 requests an exclusive lock on the particular resource, then master 102 may grant the exclusive lock on the particular resource and grant a shared lock on the group of resources that includes the particular resource. In that case, the mapping itself may also indicate that there is an exclusive lock on the particular resource granted to node 204.

If node 204 initially requests (i.e., step 1) at least a global lock on a resource and another node in the system holds an incompatible lock on the resource, then master 102 grants a global lock on a group of resources that includes the resource and sends the other node a message indicating that node 204 requests a global lock on the resource. The mapping may then indicate, in addition to the type of lock on the group of resource, that an incompatible global lock is held by another node.

Depending on the how the nodes in the database server network are configured, the other node may not grant the global lock on the resource to node 204 until a pre-determined period of time has elapsed, especially if the other node has an exclusive lock on the resource because exclusive locks are relatively "expensive" to obtain, in terms of inter-node messaging. The other node may also be configured to release its global lock on the resource despite the pre-determined period of time, if a certain number of requests for the resource from master 102 have been received.

Figure 1:
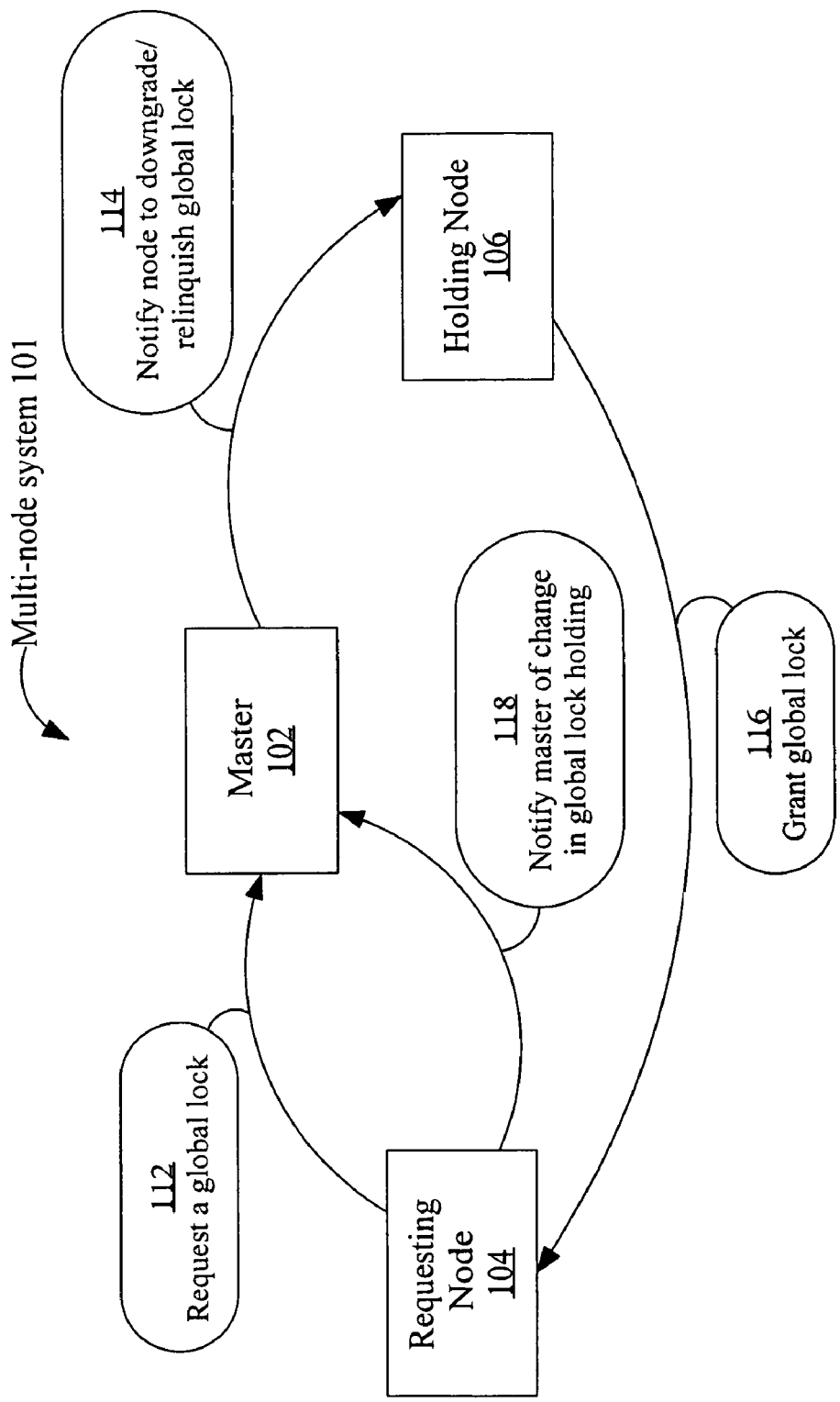
FIG. 1 is a block diagram that illustrates a multi-node system and a method for requesting and transferring cached resources, according to an embodiment of the invention.

The other node eventually either down converts the global lock on the resource to a compatible lock mode or relinquishes the lock entirely and sends node 204 a copy of the latest version of the resource, similar to the process described with respect to FIG. 1. Node 204 then notifies master 102 that node 204 holds the lock on the resource. Therefore, in the case where node 204 requests an incompatible global lock on an already locked resource and is granted a global lock on a group of resources that includes the locked resource, node 204 will receive two messages: one message from master 102 granting the lock on the group of resources, and one message from the other node granting the lock on the resource.

Region Mapping

The mapping sent to node 204 may also indicate, in addition to a global lock for the group, that a lock is held by another node in the system on a particular resource in the group. FIG. 3 is a diagram illustrating a mapping 300, on a particular node such as node 204, for a group of shared resources, according to an embodiment of the present invention. Mapping 300 may be any form of data structure (e.g., an array of characters) or data file (e.g., simple text file containing organized text) that holds information for node 204 pertaining to the lock mode for the group of resources and possibly for individual resources in the group, as described below.

In this example, mapping 300 indicates that a shared global lock 302 has been granted on the group of resources corresponding to mapping 300. Also, mapping 300 indicates that an exclusive global lock 304 is held on the resource corresponding to block 7 ("resource 7") by another node. Lastly, mapping 300 indicates that node 204 has granted a shared lock to itself (i.e., local lock manager of node 204 granted the shared lock to a local process relative to node 204).

A mapping, such as mapping 300, may maintain other information pertaining to a resource in the group of resources, such as which node in the system has the exclusive lock, for example, and when the lock was granted. Also, although FIG. 3 shows that mapping 300 corresponds to sixteen resources, mapping 300 may correspond to any number of resources, which may be determined statically by a user, such as database administrator, or determined dynamically by master 102, based on, for example, which resources are requested most often, how often conflicts occur, when conflicts occur, etc.

Subsequent Lock Requests from the Group Lock Holder

Figure 4:
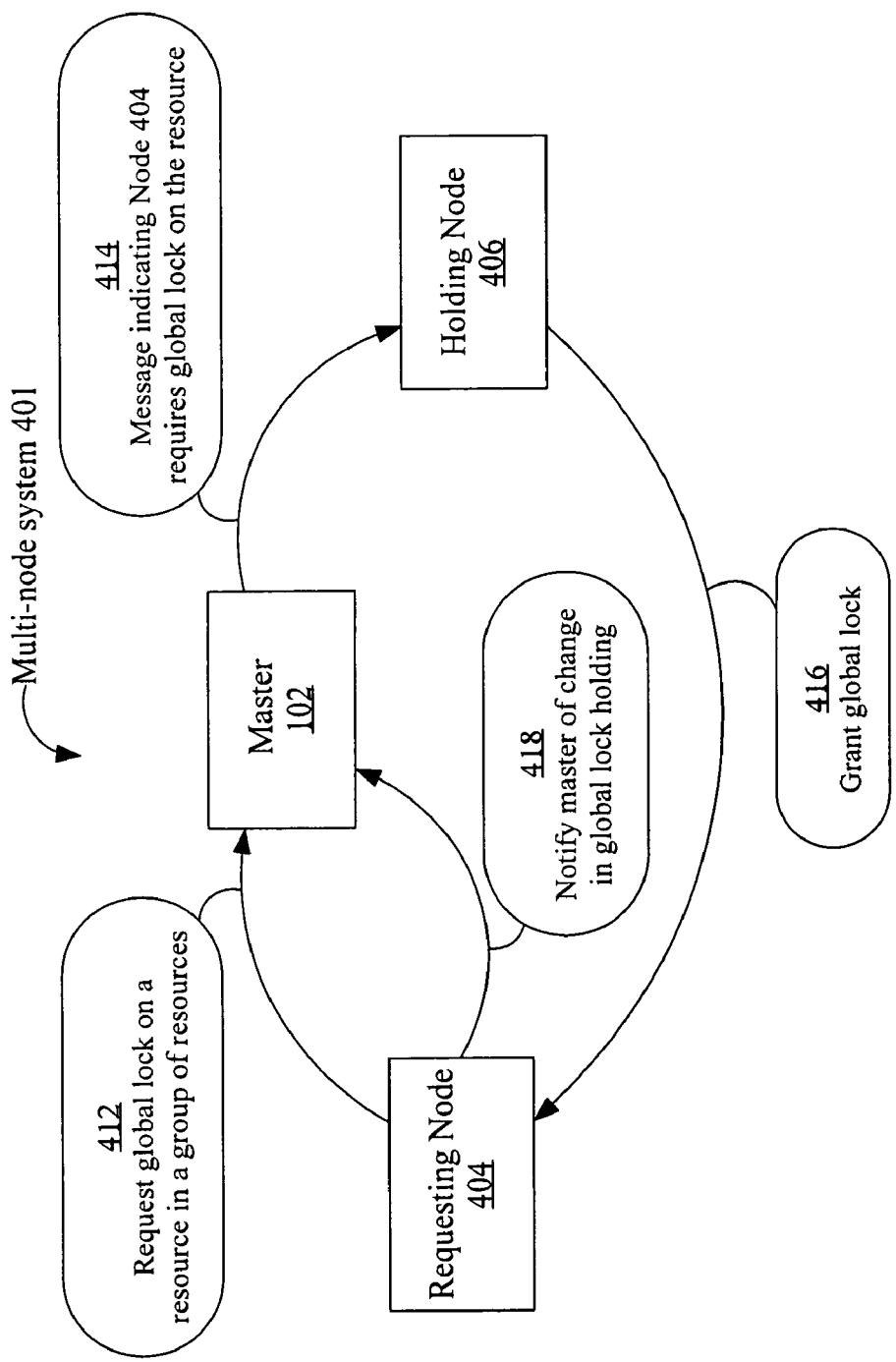
FIG. 4 is a block diagram that illustrates a multi-node system and a method for a node obtaining a lock on a resource in a group of resources where the node maintains a lock on the group of resources and another node maintains a lock on the resource, according to an embodiment of the invention.

FIG. 4 is a block diagram that illustrates a multi-node system 401 and a method for a node (e.g., a requesting node 404) obtaining a global lock on a resource in a group of resources where requesting node 404 maintains a global lock on the group of resources and another node (e.g., a holding node 406) maintains a global lock on the resource, according to an embodiment of the invention.

If requesting node 404 requires a global lock on resource 7 in mapping 300 and the lock is incompatible with the current lock on resource 7 held by holding node 406, then inter-node messages are sent to master 102 and holding node 406 according to the cache fusion protocol. For example, requesting node 404 sends a message to master 102 (step 412) requesting a global lock on resource 7. Master 102 determines which node holds the exclusive lock on resource 7 and then sends a message to holding node 406 (step 414) informing holding node 406 that requesting node 404 requires an exclusive global lock on resource 7. Holding node 406 down converts its global lock to null mode or relinquishes its global lock altogether and sends a message to requesting node 404 (step 416) granting the lock on resource 7. Holding node 406 also sends a copy of the latest version of resource 7 reflecting any modifications to resource 7 that may have occurred. Requesting node 404 informs master 102 (step 418) that requesting node 404 holds the exclusive global lock on resource 7. Master 102 updates its own table of information indicating that requesting node 404 now holds an exclusive lock on resource 7.

In situations where requesting node 404 requests a global lock for a resource in the group of resources identified by mapping 300 and either no other node holds a global lock or no other node holds an incompatible global lock on the resource, multiple inter-node messages do not need to be generated. However, if requesting node 404 wants an exclusive lock on a resource in the group of resources identified by mapping 300 which holds a region lock in shared mode, node 404 expands this global lock into a fusion lock and submits the escalate request to master 102. Requesting node 404 may indicate the lock expansion in mapping 300.

A Second Node Requesting a Lock on a Resource in the Group

Figure 5:
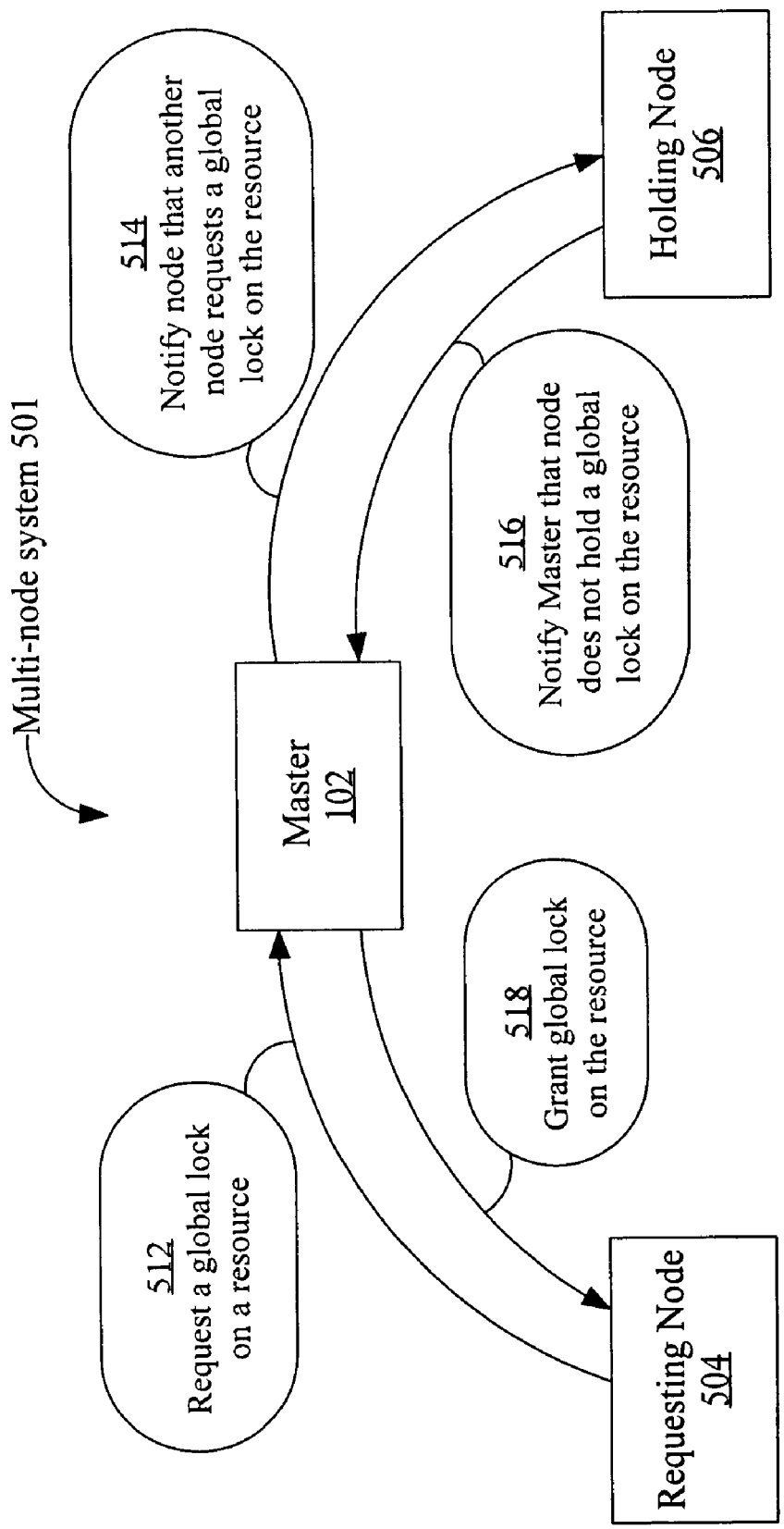
FIG. 5 is a block diagram that illustrates a multi-node system and a method for a node obtaining a lock on a resource in a group of resources where another node maintains a lock on the group of resources, according to an embodiment of the invention.

FIG. 5 is a block diagram that illustrates a multi-node system 501 and a method for a node (e.g., a requesting node 504) obtaining a lock on a resource in a group of resources where another node (e.g. a holding node 506) maintains a lock on the group of resources, according to an embodiment of the invention.

After holding node 506 obtains a mapping 300 corresponding to a group of resources, another node, such as requesting node 504, may request a global lock on a resource that is included in the group of resources corresponding to mapping 300. For instance, suppose requesting node 504 requests an exclusive global lock on a resource associated with block 3 in mapping 300 (i.e., "resource 3") and holding node 506 holds the group lock in shared mode. Requesting node 504 sends a request for an exclusive global lock on resource 3 to master 102 (step 512). Master 102 determines that holding node 506 has a shared global lock on the group of resources that includes resource 3 based on, e.g., master 102's own mapping.

There are at least two possible cases at this point: 1) holding node 506 either holds an individual shared global lock on resource 3 (i.e., a global lock just on the resource in addition to a group lock) or 2) holding node 506 does not hold an individual global lock on resource 3. If holding node 506 holds an exclusive lock, then master 102 will have the information.

If holding node 506 holds an individual shared global lock on resource 3, then the cache fusion protocol for releasing and granting locks is followed. Specifically, once holding node 506 is notified by master 102 that requesting node 504 requests an exclusive global lock, holding node 506 either down converts its lock on resource 3 from shared mode to a null mode, or relinquishes the lock on resource 3. Holding node 506 then sends node 504 a copy of resource 3 and grants an exclusive global lock on resource 3 to requesting node 504. Requesting node 504 notifies master 102 that requesting node 504 holds an exclusive global lock on resource 3. Mapping 300 on holding node 506 is updated to indicate that an exclusive global lock on resource 3 is held by another node.

If holding node 506 does not hold an individual global lock on resource 3, then master 102 sends holding node 506 a message (step 514) that another node requires an exclusive lock on resource 3. Holding node 506 notifies master 102 that is does not hold an individual global lock (step 516). Master 102 updates its mapping that corresponds to the group of resources that includes resource 3 or master 102 updates another log that indicates requesting node 504 now holds an exclusive global lock on resource 3. Master 102 grants to requesting node 504 the exclusive lock originally requested (step 518).

Other Locking Situations

There may be circumstances where the lock for an entire group of resources, which corresponds to a particular mapping, needs to be upgraded or downgraded to a different lock (e.g., downgrade from an exclusive lock to shared lock), or where the entire mapping needs to be dissolved.

For example, suppose node 204 in FIG. 2 maintains mapping 300 and node 204 holds a global lock on a group of resources in shared mode. Node 204 may have subsequently obtained multiple exclusive locks on a significant portion of the resources identified in mapping 300. It may be more efficient to upgrade the group lock to exclusive mode, depending on existing traffic among nodes in multi-node system 201 and other factors that may impact an upgrade.

A more common situation may be the occurrence of one or more other nodes requesting multiple incompatible global locks for resources in the group of resources identified in mapping 300. Node 204 may determine that the group lock needs to be downgraded or dissolved, based on one or more factors, such as how many individual locks on resources in the group of resources are held by other nodes, the likelihood of more conflicting requests in the future, and whether node 204 requires locks on any resources in the group. In such a case of a downgrade of the group lock, node 204 notifies master 102 to downgrade a mapping on master 102 corresponding to mapping 300, e.g., from an exclusive lock to a shared lock, or a shared lock to a null lock.

Node 204 may instead notify master 102 to dissolve the group lock. A situation where a dissolution may be required is where the lock mode is being converted to a lock mode of a different type, such as a read-mostly lock. In order to convert to a lock of a different type, the group lock must first be dissolved and then a new lock type is obtained.

Another circumstance that may require the communication of group locks is the failure of the master node. If master 102 fails, then a new master node is chosen among the nodes in the multi-node system. Each non-master node that maintains a mapping of a group of resources sends their respective mappings to the new master node in order for the new master node to be able to grant locks on individual resources and locks on groups of resources.

Embodiments of the invention discussed thus far have been described in a distributed locking environment. However, embodiments of the invention are not limited to a distributed environment. They may also be implemented in a non-distributed locking environment.

Hardware Overview

Figure 6:
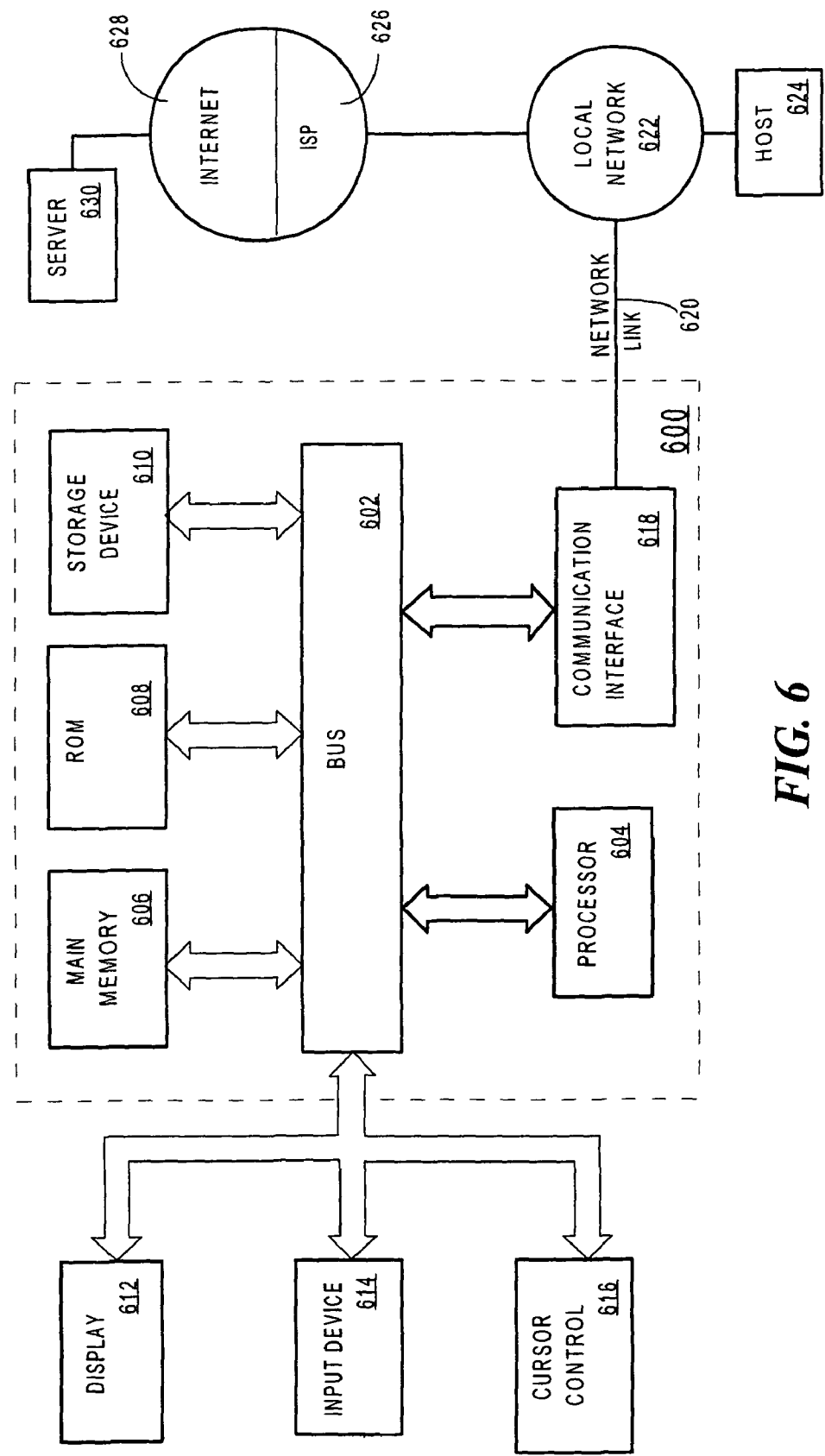
FIG. 6 is a block diagram of a computer system that may be used to implement an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor

604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing lock requests in a multi-node database system, the method comprising the steps of:
   a requesting node, of the multi-node database system, transmitting, to another node of the multi-node database system, a message representing a request for a lock on a resource; and
   wherein each node of the multi-node database system has access to a set of shared resources managed by the multi-node database system;

wherein the resource is in the set of shared resources;
as a response to transmitting the message, the requesting node receiving, from another node in the multi-node database system:
an acknowledgement that a lock on a group of resources that includes the
resource is granted to the requesting node, and
a mapping that indicates that one or more resources of the group of resources are locked by one or more nodes in the multi-node database system other than the requesting node;
while the requesting node is granted the lock on the group of resources, the requesting node retaining the mapping that indicates that the one or more resources of the group of resources are locked by the one or more nodes in the multi-node database system other than the requesting node.

2. The method of claim 1, wherein the mapping indicates that a node other than the requesting node holds a lock on the resource.

3. The method of claim 1, wherein the mapping includes information that identifies the one or more nodes.

4. The method of claim 1, wherein: the acknowledgment also indicates that the lock on the resource is granted to the requesting node; the lock on the resource is an exclusive lock; and the lock on the group of resources is a shared lock.

5. The method of claim 1, further comprising the requesting node determining, based on one or more criteria, to downgrade or dissolve the lock on the group of resources.

6. The method of claim 5, wherein the one or more criteria include one or more of the following criteria: how many individual locks on resources in the group of resources are held by nodes other than the requesting node, the likelihood of future requests from nodes other than the requesting node for locks on resources in the group of resources that conflict with the lock on the group of resources, whether the requesting node requires individual locks on any resources in the group of resources.

7. The method of claim 1, further comprising:
the requesting node determining that it requires a lock on a second resource that is included in the group of resources; based on the mapping, the requesting node determining that no other node has an incompatible lock on the second resource; and the requesting node granting the lock on the second resource.

8. The method of claim 1, further comprising:
the requesting node determining that it requires a lock on a second resource that is included in the group of resources; based on the mapping, the requesting node determining that another node has an incompatible lock on the second resource; the requesting node transmitting a message representing a request for the lock on the second resource.

9. The method of claim 1, further comprising:
receiving, at the requesting node, a message indicating a second node requests a lock on a second resource that is included in the group of resources;
in response to receiving the message, indicating in the mapping that another node holds the lock on the second resource.

10. The method of claim 9, further comprising the requesting node sending, to the other node, a second message that indicates that the other node is granted the lock on the second resource.

11. The method of claim 9, further comprising the requesting node sending, to the other node, the latest version of the second resource.

12. The method of claim 1, further comprising:
receiving, at the requesting node, a message indicating a second node requests a lock on a second resource that is included in the group of resources;
in response to receiving the message, determining, at the requesting node, to release the lock on the group of resources; and notifying a master node of the release of the lock on the group of resources.

13. The method of claim 1, wherein the requesting node and another node in the multi-node database system each includes a local lock manager.

14. A method for managing lock requests in a multi-node database system, the method comprising the steps of:
receiving, at a master node of the multi-node database system, a request, from a first node of the multi-node database system, for a lock on a first resource; and
wherein each node of the multi-node database system has access to a set of shared resources managed by the multi-node database system;
wherein the first resource is in the set of shared resources;
in response to receiving the request, the master node:
determining, based on the first resource, a group of resources that includes the first resource; and
sending, to the first node of the multi-node database system:
an acknowledgement that a lock on the group of resource is granted to the first node, and
a mapping that indicates that one or more resources of the group of resources are locked by one or more nodes in the multi-node database system other than the first node;
wherein the first node is granted the lock on the group of resources while the first node retains the mapping that indicates that the one or more resources of the group of resources are locked by the one or more nodes in the multi-node database system other than the first node.

15. The method of claim 14, wherein the mapping indicates that a node other than the first node holds a lock on the first resource.

16. The method of claim 14, wherein: the acknowledgment also indicates that the lock on the first resource is granted to the first node; the lock on the first resource is an exclusive lock; and the lock on the group is a shared lock.

17. A method for managing lock requests in a multi-node database system, the method comprising the steps of:
a first node of the multi-node database system transmitting, to another node of the multi-node database system, a first message representing a first request for a lock on a resource;
wherein each node of the multi-node database system has access to a set of shared resources managed by the multi-node database system;
wherein the resource is in the set of shared resources;
as a response to transmitting the first message, the first node receiving, from another node of the multi-node database system, an acknowledgement that a lock on a group of resources that includes the resource is granted to the first node;
while said first node holds the lock for the group of resources, the first node receiving from another node of the multi-node database system, a second message that indicates that a second node of the multi-node database system requests a lock on a particular resource, wherein the group of resources includes the particular resource, wherein the second node is different than the first node;
in response to the first node receiving the second message:

transmitting a third message granting the lock on the particular resource to the second node;

after the third message is transmitted to the second node, the first node maintaining the lock on the group of resources while the lock on the particular resource is granted to the second node; and the first node modifying a mapping that identifies the group of resources to indicate that the lock on the particular resource is held by the second node.

18. The method of claim 17, wherein the first message also represents a second request for a lock on the group of resources.

19. One or more storage media for managing lock requests in a multi-node database system, the one or more storage media storing instructions which, when executed by one or more processors, cause:

a requesting node, of the multi-node database system, transmitting, to another node of the multi-node database system, a message representing a request for a lock on a resource; and wherein each node of the multi-node database system has access to a set of shared resources managed by the multi-node database system;

wherein the resource is in the set of shared resources;

as a response to transmitting the message, the requesting node receiving, from another node in the multi-node database system:

an acknowledgement that a lock on a group of resources that includes the resource is granted to the requesting node, and a mapping that indicates that one or more resources of the group of resources are locked by one or more nodes in the multi-node database system other than the requesting node;

while the requesting node is granted the lock on the group of resources, the requesting node retaining the mapping that indicates that the one or more resources of the group of resources are locked by the one or more nodes in the multi-node database system other than the requesting node.

20. The one or more storage media of claim 19, wherein the mapping indicates that a node other than the requesting node holds a lock on the resource.

21. The one or more storage media of claim 19, wherein the mapping includes information that identifies the one or more nodes.

22. The one or more storage media of claim 19, wherein:
the acknowledgment also indicates that the lock on the resource is granted to the requesting node; the lock on the resource is an exclusive lock; and
the lock on the group of resources is a shared lock.

23. The one or more storage media of claim 19, wherein the instructions, when executed by one or more processors, further cause the requesting node determining, based on one or more criteria, to downgrade or dissolve the lock on the group of resources.

24. The one or more storage media of claim 23, wherein the one or more criteria include one or more of the following criteria: how many individual locks on resources in the group of resources are held by nodes other than the requesting node, the likelihood of future requests from nodes other than the requesting node for locks on resources in the group of resources that conflict with the lock on the group of resources, whether the requesting node requires individual locks on any resources in the group of resources.

25. The one or more storage media of claim 19, wherein the instructions, when executed by one or more processors, further cause: the requesting node determining that it requires a lock on a second resource that is included in the group of resources; based on the mapping, the requesting node determining that no other node has an incompatible lock on the second resource; and the requesting node granting the lock on the second resource.

26. The one or more storage media of claim 19, wherein the instructions, when executed by one or more processors, further cause: the requesting node determining that it requires a lock on a second resource that is included in the group of resources; based on the mapping, the requesting node determining that another node has an incompatible lock on the second resource; the requesting node transmitting a message representing a request for the lock on the second resource.

27. The one or more storage media of claim 19, wherein the instructions, when executed by one or more processors, further cause: receiving, at the requesting node, a message indicating a second node requests a lock on a second resource that is included in the group of resources; and in response to receiving the message, indicating in the mapping that another node holds the lock on the second resource.

28. The one or more storage media of claim 27, further comprising the requesting node sending, to the other node, a second message that indicates that the other node is granted the lock on the second resource.

29. The one or more storage media of claim 27, further comprising the requesting node sending, to the other node, the latest version of the second resource.

30. The one or more storage media of claim 19, further comprising: receiving, at the requesting node, a message indicating a second node requests a lock on a second resource that is included in the group of resources; in response to receiving the message, determining, at the requesting node, to release the lock on the group of resources; and notifying a master node of the release of the lock on the group of resources.

31. The one or more storage media of claim 19, wherein the requesting node and another node in the multi-node database system each includes a local lock manager.

32. One or more storage media storing instructions for managing lock requests in a multi-node database system, wherein the instructions, when executed by one or more processors, cause:

receiving, at a master node of the multi-node database system, a request from a first node of the multi-node database system, for a lock on a first resource;

wherein each node of the multi-node database system has access to a set of shared resources managed by the multi-node database system;

wherein the first resource is in the set of shared resources;

in response to receiving the request, the master node:

determining, based on the first resource, a group of resources that includes the first resource; and sending, to the first node of the multi-node database system:

an acknowledgement that a lock on the group of resource is granted to the first node, and a mapping that indicates that one or more resources of the group of resources are locked by one or more nodes in the multi-node database system other than the first node;

wherein the first node is granted the lock on the group of resources while the first node retains the mapping that indicates that the one or more resources of the group of resources are locked by the one or more nodes in the multi-node database system other than the first node.

33. The one or more storage media of claim 32, wherein the mapping indicates that a node other than the first node holds a lock on the first resource.

34. The one or more storage media of claim 32, wherein:
the acknowledgment also indicates that the lock on the first resource is granted to the first node; the lock on the first resource is an exclusive lock; and
the lock on the group is a shared lock.

35. One or more storage media for managing lock requests in a multiple node database system, the one or more storage media storing instructions which, when executed by one or more processors, causes:
a first node, of the multi-node database system, transmitting, to another node of the multi-node database system, a first message representing a first request for a lock on a resource;
wherein each node of the multi-node database system has access to a set of shared resources managed by the multi-node database system;
wherein the resource is in the set of shared resources;
as a response to transmitting the first message, the first node receiving, from another node of the multi-node database system, an acknowledgement that a lock on a group of resources that includes the resource is granted to the first node;
while said first node holds the lock for the group of resources, the first node receiving~ from another node of the multi-node database system, a second message that indicates that a second node of the multi-node database system requests a lock on a particular resource, wherein the group of resources includes the particular resource, wherein the second node is different than the first node;
in response to the first node receiving the second message:
transmitting a third message granting the lock on the particular resource to the second node;
after the third message is transmitted to the second node, the first node maintaining the lock on the group of resources while the lock on the particular resource is granted to the second node; and
the first node modifying a mapping that identifies the group of resources to indicate that the lock on the particular resource is held by the second node.

36. The one or more storage media of claim 35, wherein the first message also represents a second request for a lock on the group of resources.

* * * * *

UNITED STATES PATENT AND TRADEMARK OFFICE
CERTIFICATE OF CORRECTION

PATENT NO. : 8,103,642 B2  
APPLICATION NO. : 11/346822  
DATED : January 24, 2012  
INVENTOR(S) : Ho et al.

Page 1 of 1

It is certified that error appears in the above-identified patent and that said Letters Patent is hereby corrected as shown below:

IN THE SPECIFICATIONS:

In column 3, line 62, before "DESCRIPTION" insert -- BRIEF --.

IN THE CLAIMS:

In column 12, line 61, in Claim 17, delete "receiving" and insert -- receiving, --, therefor.

In column 14, line 46, in Claim 32, delete "request" and insert -- request, --, therefor.

In column 16, line 5, in Claim 35, delete "receiving~" and insert -- receiving, --, therefor.

Signed and Sealed this  
Third Day of April, 2012

David J. Kappos  
*Director of the United States Patent and Trademark Office*